United States Patent
Khadiwala et al.

(10) Patent No.: US 8,670,649 B1
(45) Date of Patent: Mar. 11, 2014

(54) SCENE DETECTION USING WEIGHTING FUNCTION

(71) Applicant: Hulu LLC, Los Angeles, CA (US)

(72) Inventors: Ravi Khadiwala, Bartlett, IL (US); Baptiste Coudurier, Los Angeles, CA (US)

(73) Assignee: Hulu, LLC, Santa Monica, CA (US)

( * ) Notice: Subject to any disclaimer, the term of this patent is extended or adjusted under 35 U.S.C. 154(b) by 0 days.

(21) Appl. No.: 13/649,001

(22) Filed: Oct. 10, 2012

(51) Int. Cl.
*H04N 9/80* (2006.01)
*H04N 5/14* (2006.01)
*H04N 5/445* (2011.01)
*H04N 5/783* (2006.01)
*H04N 7/025* (2006.01)
*G06K 9/34* (2006.01)
*G06K 9/46* (2006.01)

(52) U.S. Cl.
USPC ........... 386/241; 386/248; 386/343; 348/700; 348/701; 382/173; 382/190; 725/34; 725/35; 725/41; 725/42

(58) Field of Classification Search
USPC ........... 386/241, 248, 343, E5.001; 348/700, 348/701, E5.067, E7.019, E7.061; 375/E7.262, E7.263; 382/173, 190; 707/E17.028; 725/34, 35, 41, 42
See application file for complete search history.

(56) References Cited

U.S. PATENT DOCUMENTS

| | | | |
|---|---|---|---|
| 6,928,233 B1 * | 8/2005 | Walker et al. | 386/241 |
| 8,059,936 B2 * | 11/2011 | Chen et al. | 386/248 |
| 2002/0016736 A1 * | 2/2002 | Cannon et al. | 705/14 |
| 2004/0221304 A1 * | 11/2004 | Sparrell et al. | 725/34 |

* cited by examiner

*Primary Examiner* — Thai Tran
*Assistant Examiner* — Syed Hasan
(74) *Attorney, Agent, or Firm* — Brian N. Young; Fountainhead Law Group P.C.

(57) ABSTRACT

In one embodiment, a method includes analyzing characteristics of a media program to label portions of the media program with a plurality of labels. Portions of the media program that are determined to be substantially similar are labeled with a same label. The method then analyzes different partitionings of a sequence of the labels to determine partitions for the media program based on a weighting function. A plurality of partitions of the media program are outputted based on comparing the different partitionings of the sequence of labels using the weighting function. The plurality of partitions partition the media program into a plurality of portions and provide points for insertion of information for a service in the media program.

18 Claims, 4 Drawing Sheets

SCENE DETECTION USING WEIGHTING FUNCTION

BACKGROUND

Users often view a media program through a media player. For example, a company provides a service to deliver television episodes, motion pictures, and other content produced as primary content of interest to users. The company receives the media program from media program providers in a format where the media program is usually not interrupted with advertisements or commercials. However, often, the company would like to insert information, such as advertisements, during certain parts of the media program. For example, the media program received from the media program provider may be a television show that does not have any commercial breaks in it. However, the company would like to insert advertisements at certain points in the television show.

The insertion of the advertisements generates revenue for the company. However, the advertisements also disrupt the user experience by interrupting the viewing of the media program to allow the advertisements to be played. To limit the disruption to the viewing experience, the company attempts to insert the advertisements during points in the media program that provide the least disruption to the user. For example, an optimal place to insert an advertisement is when a scene change occurs. In this case, the flow of the media program is not abruptly interrupted.

To determine where to insert the advertisement, a company employs users that physically watch the media programs. A user then subjectively determines when a good point in the media program occurs to insert an advertisement. Thus, the point of insertion is purely subjective. Further, many man hours are used having users review each media program.

SUMMARY

In one embodiment, a method includes analyzing characteristics of a media program to label portions of the media program with a plurality of labels. Portions of the media program that are determined to be substantially similar are labeled with a same label. The method then analyzes different partitionings of a sequence of the labels to determine partitions for the media program based on a weighting function. A plurality of partitions of the media program are outputted based on comparing the different partitionings of the sequence of labels using the weighting function. The plurality of partitions partition the media program into a plurality of portions and provide points for insertion of information for a service in the media program.

In one embodiment, a non-transitory computer-readable storage medium is provided containing instructions, that when executed, control a computer system to be configured for: analyzing characteristics of a media program to label portions of the media program with a plurality of labels, wherein portions of the media program that are determined to be substantially similar are labeled with a same label; analyzing different partitionings of a sequence of the labels to determine partitions for the media program based on a weighting function; and outputting a plurality of partitions of the media program based on comparing the different partitionings of the sequence of labels using the weighting function, wherein the plurality of partitions partition the media program into a plurality of portions and provide points for insertion of information for a service in the media program.

In one embodiment, an apparatus is provided comprising: one or more computer processors; and a non-transitory computer-readable storage medium comprising instructions, that when executed, control the one or more computer processors to be configured for: analyzing characteristics of a media program to label portions of the media program with a plurality of labels, wherein portions of the media program that are determined to be substantially similar are labeled with a same label; analyzing different partitionings of a sequence of the labels to determine partitions for the media program based on a weighting function; and outputting a plurality of partitions of the media program based on comparing the different partitionings of the sequence of labels using the weighting function, wherein the plurality of partitions partition the media program into a plurality of portions and provide points for insertion of information for a service in the media program.

The following detailed description and accompanying drawings provide a better understanding of the nature and advantages of particular embodiments.

DETAILED DESCRIPTION

Described herein are techniques for a scene detection system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
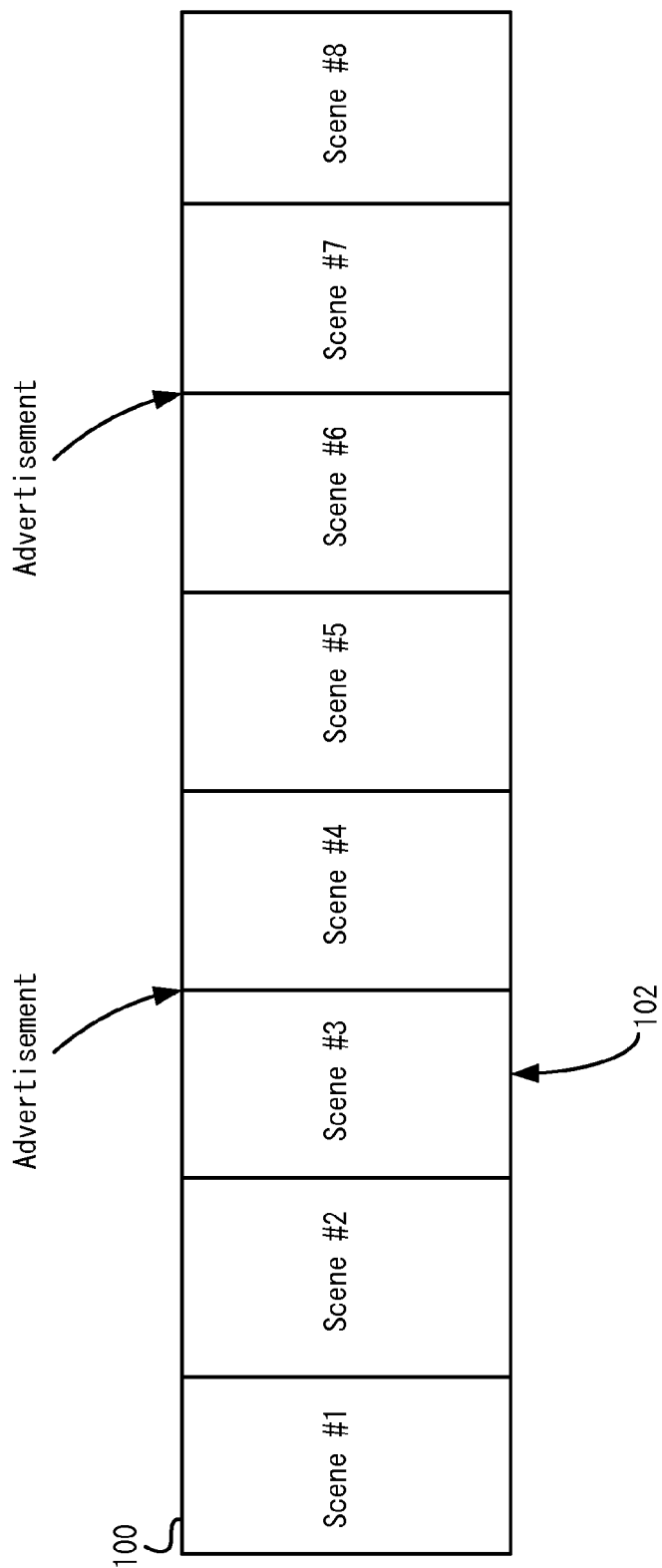
FIG. 1 shows an example of a media program according to one embodiment.

FIG. 1 shows an example of a media program 100 according to one embodiment. As discussed above, the media program may be video content, such as a television show, motion picture, etc. Although a media program is discussed, other content may be appreciated, such as audio content. Conceptually, media program 100 may be organized into multiple scenes, which are portions of the media program. The scenes may be a collection of shots. A shot may be a portion of the media program that includes similar content. For example, a shot may be a portion of video content that is shot from one camera angle. A second shot would be when the media program cuts to a second camera angle. Each scene may be a logical grouping of shots. While the partitioning of the media program into scenes may be arbitrary, a preferable scene break is where continuity between the two adjacent scenes is limited.

Media program 100 has been partitioned into various scenes in between which information may be inserted, such as advertisements or other information a company may want to insert. For discussion purposes, the information being inserted will be described as advertisements, but it will be understood that particular embodiments are not limited to inserting advertisements. For example, a company may insert service announcements, recommendations for other media programs, etc.

In one embodiment, the company inserts the information in between some of the scene transitions, but not all. For example, a company inserts advertisements in between scene #3 and scene #4 and also between scene #6 and scene #7. The insertion of the advertisement in between scenes provides a logical point for the insertion because there is minimal logical connection between the scenes. For example, scene #3 may include 3 characters talking and scene #4 may include 2 other characters that are different from the 3 characters shown in scene #3. Thus, the continuity of the story is not broken by the insertion of the advertisement because presumably the conversation between the 3 characters talking in scene #3 has ended and the media program is transitioning to show the 2 other characters in scene #4. However, if the information was inserted in the middle of scene #3 as shown at 102, the insertion may affect the user experience because the flow of the story may be interrupted. In this case, 3 characters may be talking and then an advertisement is inserted in the middle of their conversation. Then, when the media program returns from the inserted information, the conversation is continued. This is disruptive to the user viewing experience.

While FIG. 1 shows a conceptual insertion of advertisements in between scenes, the scenes need to be determined first. Accordingly, particular embodiments determine partitions for the media program automatically. Advertisements may then be inserted based on the partitions. In one example, a company provides a service to users that delivers media programs through a delivery technology, such as streaming. The company receives the video from a media program provider and would like to insert advertisements into the media program, which may generate revenue for the company. Also, the media program received from the media program provider may not have commercials or ad breaks, and thus the company has to determine where to insert any advertisements.

Figure 2:
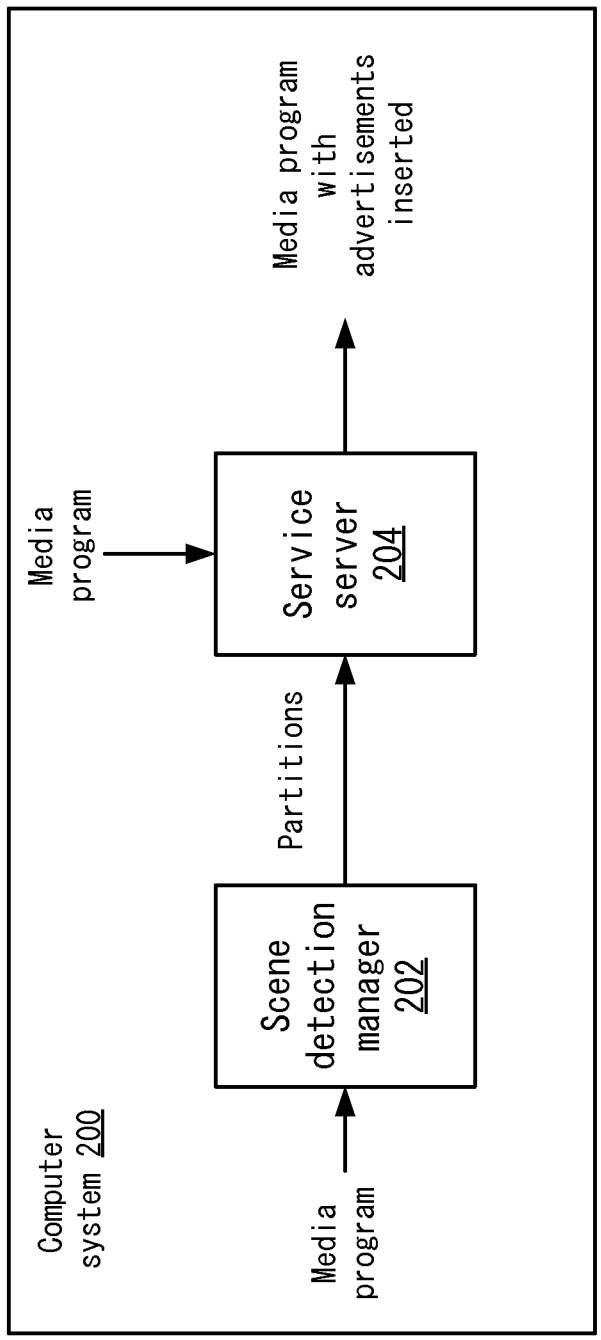
FIG. 2 depicts a computer system for determining partitions for the media program according to one embodiment.

FIG. 2 depicts a computer system 200 for determining partitions for the media program according to one embodiment. A scene detection manager 202 receives the media program. Scene detection manager 202 then determines partitions in the media program. For example, the partitions divide the media program into portions, such as scenes. As will be described in more detail below, scene detection manager 202 labels "shots" in the media program. A shot may be a portion of the media program that is determined to be similar. For example, as discussed above, a shot may be a portion of video shot from a camera angle that includes similar content.

Once scene detection manager 202 determines all of the shots in the media program, scene detection manager 202 analyzes the shots to determine the partitions. For example, as will be discussed below, a weighting function is used to determine an optimal partitioning of the media program based on the determination of the shots. In one embodiment, a partition is a point in time in the media program, such as the 2:30 minute elapsed time. In other embodiments, the partition includes a frame identifier, index, a range of time, or other information that can identify a portion of the media program. Scenes, which are portions of the media program, are then formed in between the partitions.

A service server 204 then receives the partitions for the media program from scene detection manager 202. In one embodiment, service server 204 may insert advertisements into the media program. In other embodiments, service server 204 may perform other services, such as inserting service announcements, recommendations, or other information into the media program.

Service server 204 uses the partitions for the media program to determine when to insert an advertisement. For example, service server 204 may not insert an advertisement at every partition and needs to determine which partitions are optimal for ad placement. Also, when service server 204 determines that an advertisement should be inserted, that advertisement is inserted based on the partition. It should be noted that service server 204 may alter the insertion point slightly from the partition. For example, service server 204 may determine that inserting an advertisement a couple seconds after the partition may be optimal. Also, if the partition is a range, service server 204 may insert the advertisement anywhere in the range. Service server 204 then outputs the media program with the advertisements included.

Figure 3:
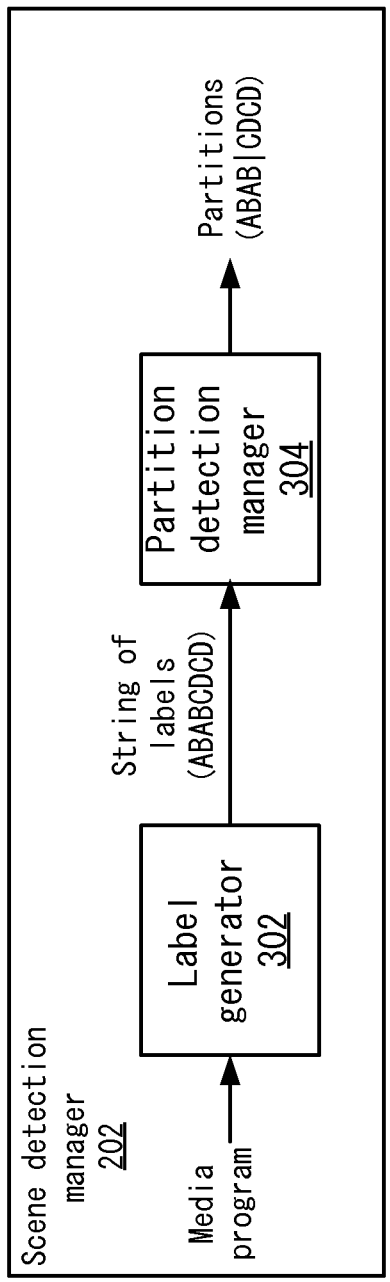
FIG. 3 depicts a more detailed example of a scene detection manager according to one embodiment.

The determination of the partitions will now be described in more detail. FIG. 3 depicts a more detailed example of scene detection manager 202 according to one embodiment. A label generator 302 receives the media program and generates a string of labels. The string of labels includes a plurality of identifiers that label each shot in the media program.

In one embodiment, each shot may be labeled using a character, but other identifiers may be used, such as symbols. For example, a string of labels may be "ABABCDCD". In the string, the label A represents a first shot. For example, the shot may be a portion of the media program from one camera angle that includes similar objects. In one example, the shot may be 3 characters in a movie that are having a conversation from the same camera angle. The label B may then be a second camera angle for the same conversation among the 3 characters. The label C may then be a camera angle that includes 2 characters having a conversation. These 2 characters may be different from the 3 characters included in the A and B shots. However, the 2 characters in this shot may also be 2 of the 3 characters from the A and B shots. The label D may be another camera angle of the 2 people having a conversation in the C shot.

In one embodiment, label generator 302 analyzes characteristics of the media program to determine the different shots. For example, label generator 302 analyzes aspects of the content to determine similar content over time. In a specific embodiment, label generator 302 uses a clustering algorithm that creates a histogram of video characteristics, such as pixel intensities. Label generator 302 determines similar distributions of pixel intensities to determine the shots. For example, shots are groupings of pixel intensities that stay within a certain threshold over a period of time.

In one example, label generator 302 uses a threshold that groups similar content together in a shot. This allows for some variance in the content up to a threshold. For example, when a camera angle changes, the new camera angle causes the characteristics of the content to change. Most likely, label generator 302 then determines that the different camera angles are different shots. In other examples, a camera angle may not need to be changed to constitute another shot. Rather, the content may change drastically, such as a character may leave a scene while the camera angle stays the same. The change in content caused by the character leaving the scene may cause label generator 302 to determine another shot has occurred.

Partition detection manager 304 receives the string of labels and determines the partitions. In one example, partition detection manager 304 receives a weighting function and uses the weighting function to analyze the string or sequence of labels. The weighting function may be a function that compares different partitionings and rates the comparison. Partition detection manager 304 may then select partitions that provide the lowest weight.

In one example, the weighting function may be:

$$w(S) = ((\text{number of unique elements in } S)\hat{~}x)/\text{length of } S,$$

where S is a scene and x is a number.

For example, x may be a number, such as x=3, but x could be a function, such as x is a function of the number of shots. The weighting function is based on the number of unique elements in a scene and the length of the scene. In this case, the weighting function rewards a longer scene with fewer shots. This is because when the number of unique elements in the nominator is smaller and the length of the scene is larger, the weighting function outputs a smaller weight. The exponent x may thus be determined empirically to produce the desired characteristics in the partitioning, such as punish partitions that have scenes that are very far from the target length. The exponent x may depend on the number of shots. In other embodiments, the exponent x may depend on the average duration (e.g., in seconds) of a shot or it could be fine-tuned based on how long it is desired to have the scenes be. For example, the exponent x may be determined by $$x = |\text{target scene length} - \text{average scene length in this partitioning}|^{-c},$$

where c is a positive constant.

In one example, partition detection manager 304 receives a string of "ABABCDCD". In this example, the string may be partitioned into ABAB|CDCD. This breaks the media program into a first scene ABAB and a second scene CDCD. The first and second scenes are determined because it may be desirable to have the similar information in the scene and also have the scene be a certain length. For example, it may not be desirable to have 8 scenes of A|B|A|B|C|D|C|D.

Partition detection manager 304 may test multiple partitionings to determine which partitioning is desired. For example, a first partitioning may be ABAB|CDCD and partition detection manager 304 calculates a first total weight for this partitioning. Another partitioning may be A|B|A|B|C|D|C|D and partition detection manager 304 calculates a second total weight for this partitioning. To illustrate the calculation, the following describes the calculation of weights for different partitionings of the string.

In one embodiment, partition detection manager 304 considers the weights of all of the partitionings. However, partition detection manager 304 may not calculate the weights of all of the partitionings. For example, a dynamic programming algorithm may be used where partition detection manager 304 does not calculate a weight for every single partitioning to determine the partitioning with the lowest weight. For example, using dynamic programming, the number of calculations may be performed in (O(n^2)), where n is the number of shots.

The following shows the calculation of weights for various partitionings:
Partitioning #1:
A|BABCDCD would have a total weight of
w(A)+w(BABCDCD)
(1^3)/1+(4^3)/7=10.14
In the above, weight w(A) has a number of unique elements of 1 (i.e., the only label is A), the value of x is 3 (i.e., 3 is a constant), and the length of the scene is 1 (i.e., the only label is A). For the weight of w(BABCDCD), the number of unique elements is 4 (i.e., the labels are A, B, C, and D), the value of x is 3, and the length of the scene is 7 (i.e., there are 7 labels). This yields a value of 10.14.
Partitioning #2:
ABABCDCD
w(ABABCDCD)
(4^3)/8=8
In this example, there are no partitions, the number of unique elements is 4, and the length of the scene is 8, which yields a weight of 8.
Partitioning #3:
AB|AB|CDCD
w(AB)+w(AB)+w(CDCD)
(2^3)/2+(2^3)/2+(2^3)/4=10
In this example, for the weight of w(AB), the number of unique elements is 2 and the length of the scene is 2. For the weight of w(CDCD), the number of unique elements is 2, and the length of the scene is 4. The total combined weight is 10 in this case.
Partitioning #4:
ABAB|CDCD
w(ABAB)+w(CDCD)
(2^3)/4+(2^3)/4=4
In this example, the weight of w(ABAB), the number of unique elements is 2 and the length of the scene is 4. For the weight of w(CDCD), the number of unique elements is 2 and the length of the scene is 4. The combined weights provide a weight of 4 in this case.
Other Partitionings:
ABABCDCD
ABABCDC|D
ABABCD|CD
ABABCD|C|D
ABABC|DCD
ABABC|DC|D
. . .
A|B|A|B|C|D|C|D In the above, the lowest sum of the weights is 4. Although the weights for the other partitionings are not shown, the weights are not less than 4. Thus, partition detection manager 304 determines that the partitioning of the string should be ABAB|CDCD.

Some other examples of strings and the selected partitioning may be:
AAAABBBB→AAAA|BBBB
ABCCBACFDEEFGHGH→ABCCBA|FDEEF|GHGH
AAAA→AAAA
AB→A|B
ABCABDEDCDE→ABCAB|DEDCDE
ABCDEFG→A|B|C|D|E|F|G In one embodiment, partition detection manager 304 may perform certain optimizations based on the type of service being inserted. For example, the weight of a partition may be equal to:

$$w(\text{scene}\_1) + w(\text{scene}\_2) + \ldots w(\text{scene}\_k) + C^*(\text{number of scenes shorter in length than Y minutes}),$$

where C and Y are constants.

In the above case, this adds weights for partitions that are close to each other. For example, for a partitioning that has a number of scenes that are shorter than x minutes, the weight will be increased as the number of short scenes increases. If the service desires longer scenes, then the above weighting may be used. The opposite may also be used where scenes that are too long are punished with a higher weight.

After outputting of the partitions in the media program, service server 204 determines where to insert to advertisements. For example, service server 204 may want to insert advertisements within the 8-10 minute range of the media program. Service server 204 then determines a partition with the lowest weight within that range. Service server 204 would then continue inserting advertisements in other ranges, such as in the 18-20 minute range. In other embodiments, scene detection manager 202 may adjust the weights for other partitions that are not within the desired range. For example, scene detection manager 202 may adjust weights for partitions between the 0-8 minute range to infinity or a large number so service server 204 most likely will not select these partitions].

In another example, the position of the partitions may be moved to other positions to test whether an advertisement should be inserted at a partition. For example, service server 204 determines if a partition is a good ad break position by moving a partition by a certain number of positions (1, 2, etc.) and determining if the weight changes very much. For example, if moving the partition by 1 or 2 frames in a video does not change the weight for the adjacent scenes (or the total weight) very much (e.g., the change is under a threshold), this partition may not be a good partition for inserting an advertisement. The reasoning is that a small change in weight means that the content of the two scenes is somewhat similar. In one example, a first scene may have 3 characters talking. Then, a second scene may have the same 3 characters talking, but in a different setting or background. While the setting or background may be different, the same characters are talking. Thus, placing an advertisement at this partition may break the logical flow of the media program.

Figure 4:
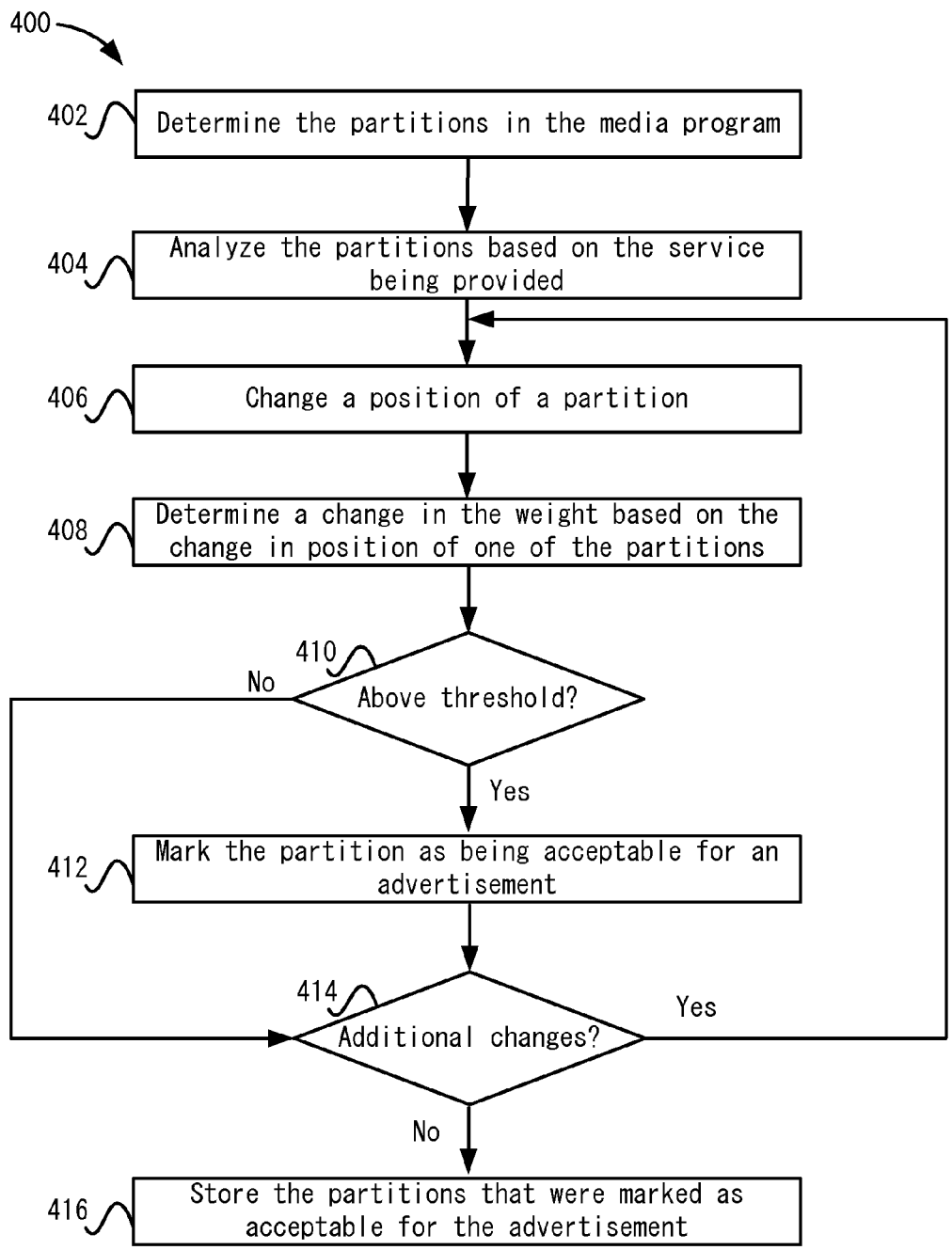
FIG. 4 depicts a simplified flowchart for determining where to insert advertisements according to one embodiment.

FIG. 4 depicts a simplified flowchart for determining where to insert advertisements according to one embodiment. At 402, service server 204 determines the partitions in the media program. At 404, service server 204 analyzes the partitions based on the service being provided. For example, different services may have different requirements for inserting information into the media program. In one example, ad insertion may desire that advertisements be inserted around fixed intervals.

At 406, service server 204 changes a position of a partition. For example, service server 204 may select certain partitions in a range where an advertisement should be inserted. At 408, service server 204 then determines a change in the weight based on the change in position of one of the partitions.

At 410, service server 204 determines if the change is above a threshold. For example, if the weight change is minimal, then there might not be many differences between the two scenes adjacent to the partition. Thus, this partition may not be good for placing an advertisement. If the change is below the threshold, the process does not make the change and reiterates to 412 to determine if other changes to the positions of other partitions should be made. Conversely, if the change is above the threshold, then the amount of changes between the scenes may be acceptable.

At 412, if the change is above the threshold, then service server 204 marks the partition as being acceptable for an advertisement. At 414, service server 204 determines if additional changes to partitions should be made. If so, the process reiterates to 406 to analyze additional changes. If not, at 416, service server 204 stores the partitions that were marked as acceptable for the advertisement. Another process may then insert advertisements based on the marked partitions. For example, service server 204 may insert advertisements at every marked partition. In other embodiments, service server 204 may insert advertisements in a portion of the marked partitions. For example, service server 204 may determine a marked partition that is closest to the 8 minute, 16 minute, and 24 minute points in the media program.

Other methods may also be used to determine where to insert advertisements. For example, the automatic determination of partitions may provide a guide for a user to insert advertisements into the media program. The user may view the video and see where the partitions are determined. Then, the user can select which partitions to insert advertisements. In this case, a user may jump to each partition rather than viewing the video continuously.

Accordingly, particular embodiments perform automatic partitioning of a media program that provides partitions that might be optimal for insertion of information for a service. In one embodiment, the partitions may allow for automatic insertion of advertisements.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:

analyzing, by a computer system, characteristics of a media program to label portions of the media program with a plurality of labels, wherein portions of the media program that are determined to be substantially similar are labeled with a same label;

analyzing, by the computer system, different partitionings of a sequence of the labels to determine partitions for the media program based on a weighting function, wherein the weighting function is proportional to a number of unique labels in a scene and inversely proportional to a length of the scene, wherein the scene is based on a partitioning and includes one or more labels; and outputting, by the computer system, a plurality of partitions of the media program based on comparing the different partitionings of the sequence of labels using the weighting function, wherein the plurality of partitions partition the media program and provide points for insertion of information for a service in the media program.

2. The method of claim 1, further comprising:

measuring portions of at least some of the different partitionings to determine a weight for each of the different partitionings;

comparing the weights of the at least some of the different partitionings; and selecting one of the different partitionings based on the comparing.

3. The method of claim 1, wherein the weighting function is ((a number of unique labels in the scene)^x)/the length of the scene, where x is a number.

4. The method of claim 1, wherein analyzing characteristics of the media program comprises determining a plurality of shots, wherein each shot is labeled with a label and a same shot is labeled with a same label.

5. The method of claim 4, wherein the plurality of shots are determined based on clustering of similar characteristics in each shot.

6. The method of claim 4, wherein a shot in the plurality of shots is determined based on objects in the shot.

7. The method of claim 1, wherein the weighting function is based on determining a partitioning of scenes that are considered optimal for inserting advertisements at one or more of the plurality of partitions.

8. The method of claim 1, further comprising analyzing the plurality of partitions to determine which partitions are optimal for inserting the information.

9. The method of claim 8, wherein analyzing comprises:
shifting a partition;
determining a change in weight based on the shifting;
determining if the change indicates the partition is acceptable for inserting the information; and
marking the partition as acceptable for inserting the information when the change is determined as acceptable.

10. A non-transitory computer-readable storage medium containing instructions, that when executed, control a computer system to be configured for:
analyzing characteristics of a media program to label portions of the media program with a plurality of labels, wherein portions of the media program that are determined to be substantially similar are labeled with a same label;
analyzing different partitionings of a sequence of the labels to determine partitions for the media program based on a weighting function, wherein the weighting function is proportional to a number of unique labels in a scene and inversely proportional to a length of the scene, wherein the scene is based on a partitioning and includes one or more labels; and
outputting a plurality of partitions of the media program based on comparing the different partitionings of the sequence of labels using the weighting function, wherein the plurality of partitions partition the media program and provide points for insertion of information for a service in the media program.

11. The non-transitory computer-readable storage medium of claim 10, further configured for:
measuring portions of each of at least some of the different partitionings to determine a weight for each of the different partitionings;
comparing the weights of the at least some of the different partitionings; and
selecting one of the different partitionings based on the comparing.

12. The non-transitory computer-readable storage medium of claim 10, wherein the weighting function is ((a number of unique labels in the scene)^x)/the length of the scene, where x is a number.

13. The non-transitory computer-readable storage medium of claim 10, wherein analyzing characteristics of the media program comprises determining a plurality of shots, wherein each shot is labeled with a label and a same shot is labeled with a same label.

14. The non-transitory computer-readable storage medium of claim 13, wherein the plurality of shots are determined based on clustering of similar characteristics in each shot.

15. The non-transitory computer-readable storage medium of claim 13, wherein a shot in the plurality of shots is determined based on objects in the shot.

16. The non-transitory computer-readable storage medium of claim 10, wherein the weighting function is based on determining a partitioning of scenes that are considered optimal for inserting advertisements at one or more of the plurality of partitions.

17. The non-transitory computer-readable storage medium of claim 10, further configured for analyzing the plurality of partitions to determine which partitions are optimal for inserting the information.

18. An apparatus comprising:
one or more computer processors; and
a non-transitory computer-readable storage medium comprising instructions, that when executed, control the one or more computer processors to be configured for:
analyzing characteristics of a media program to label portions of the media program with a plurality of labels, wherein portions of the media program that are determined to be substantially similar are labeled with a same label;
analyzing different partitionings of a sequence of the labels to determine partitions for the media program based on a weighting function, wherein the weighting function is proportional to a number of unique labels in a scene and inversely proportional to a length of the scene, wherein the scene is based on a partitioning and includes one or more labels; and
outputting a plurality of partitions of the media program based on comparing the different partitionings of the sequence of labels using the weighting function, wherein the plurality of partitions partition the media program and provide points for insertion of information for a service in the media program.

* * * * *